(12) United States Patent
Boehme et al.

(10) Patent No.: US 10,296,614 B2
(45) Date of Patent: May 21, 2019

(54) BULK DATA INSERTION IN ANALYTICAL DATABASES

(71) Applicant: International Business Machines Corporation, Armonk, NY (US)

(72) Inventors: Thomas F. Boehme, Boeblingen (DE); Andreas Brodt, Gerlingen (DE); Oliver Schiller, Dettingen/Teck (DE)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 15/371,565

(22) Filed: Dec. 7, 2016

(65) Prior Publication Data
US 2018/0157694 A1    Jun. 7, 2018

(51) Int. Cl.
*G06F 17/30* (2006.01)
(52) U.S. Cl.
CPC .. *G06F 17/30374* (2013.01); *G06F 17/30339* (2013.01); *G06F 17/30289* (2013.01); *G06F 17/30315* (2013.01); *G06F 17/30492* (2013.01); *G06F 17/30584* (2013.01); *G06F 17/30592* (2013.01)
(58) Field of Classification Search
CPC ......... G06F 17/30339; G06F 17/30584; G06F 17/30592; G06F 17/30289; G06F 17/30315; G06F 17/30492; G06F 17/30598
USPC ........ 707/602, 696, 715, 754, 756, 803, 812
See application file for complete search history.

(56) References Cited

U.S. PATENT DOCUMENTS

| | | | |
|---|---|---|---|
| 6,886,016 B2 | 4/2005 | Hansen et al. | |
| 7,792,839 B2 | 9/2010 | Hrle et al. | |
| 8,868,484 B2 * | 10/2014 | Aggarwal | G06F 17/30592 707/602 |
| 8,996,544 B2 | 3/2015 | Ziauddin et al. | |
| 9,442,694 B1 | 9/2016 | Boehme et al. | |

(Continued)

FOREIGN PATENT DOCUMENTS

WO    2014051742 A2    4/2014

OTHER PUBLICATIONS

"Optimizing Table Scans with Zone Maps", The Data Warehouse Insider, Nov. 11, 2014, https://blogs.oracle.com/datawarehousing/entry/optimizing_table_scans_with_zone, Retrieved from Internet May 7, 2016, 8 pages.

(Continued)

*Primary Examiner* — Dangelino N Gortayo
(74) *Attorney, Agent, or Firm* — Edell, Shapiro & Finnan, LLC

(57) ABSTRACT

A present invention embodiment relates to inserting data to a data table, where the data table has multiple data records and involves at least one organizing attribute. The embodiment defines a set of data blocks having records of the data table and assigns to each data block of the set of data blocks a predefined maximum number of records of the data table or a predefined maximum amount of storage. Data records for each data block of the set of data blocks may be stored on a storage system. Further data records may be sorted based on values of the organizing attribute in the buffered data records. The sorted data records may be written on the storage system in their order. Attribute value information may be determined for the further data blocks for supporting query processing against the data table.

18 Claims, 4 Drawing Sheets

(56) References Cited

U.S. PATENT DOCUMENTS

| | | | |
|---|---|---|---|
| 2005/0152384 A1* | 7/2005 | Chong | H04L 47/15 370/412 |
| 2008/0154934 A1* | 6/2008 | Lau | G06F 12/0866 |
| 2009/0171885 A1* | 7/2009 | Silberstein | G06F 17/30584 |
| 2010/0281013 A1 | 11/2010 | Graefe | |
| 2010/0306412 A1* | 12/2010 | Therrien | H03M 7/3084 709/247 |
| 2012/0254199 A1 | 10/2012 | Kuno et al. | |
| 2014/0095520 A1 | 4/2014 | Ziauddin et al. | |
| 2015/0088812 A1* | 3/2015 | Ziauddin | G06F 17/30289 707/609 |
| 2015/0286681 A1* | 10/2015 | Baer | G06F 17/30486 707/754 |
| 2015/0363447 A1 | 12/2015 | Dickie | |
| 2017/0286004 A1* | 10/2017 | Hu | G11C 29/808 |

OTHER PUBLICATIONS

Barbuzzi et al., "Parallel Bulk Insertion for Large-scale Analytics Applications", LADIS, 2010, Zurich, Switzerland, http://citeseerx.ist.psu.edu/viewdoc/download?doi=10.1.1.190.8518&rep=rep1&type=pdf, 5 pages.

Ahuja, Ray, "Introducing DB2 9, Part 2: Table partitioning in DB2 9", IBM developerWorks, May 24, 2006, http://www.ibm.com/developerworks/data/library/techarticle/dm-0605ahuja2/, Retrieved from Internet Jun. 28, 2016, 5 pages.

Idreos, Stratos, "Database Cracking: Towards Auto-tuning Database Kernels", CWI and University of Amsterdam, 2010, pp. 1-270.

"Tournament sort", Wikipedia, the free encyclopedia, retrieved from Internet Jun. 28, 2016, https://en.wikipedia.org/wiki/Tournament_sort, 1 page.

Graefe et al., "Self-selecting, self-tuning, incrementally optimized indexes", EDBT, Mar. 2010, Lausanne, Switzerland, pp. 371-381 (11 pages).

Kersten et al., "Cracking the Database Store", CIDR Conference, 2005, Amsterdam, The Netherlands, 12 pages.

"Using Zone Maps", Database Data Warehousing Guide, Oracle, http://docs.oracle.com/database/121/DWHSG/zone_maps.htm#DWHSG9355, retrieved from Internet Mar. 2, 2016, 25 pages.

Brodt et al., "Partitioned Joins in Analytical Databases". U.S. Appl. No. 14/919,092, filed Oct. 21, 2015, 38 pages.

Brodt et al., "Sorting Tables in Analytical Databases", U.S. Appl. No. 15/163,139, filed May 24, 2016, 28 pages.

Brodt et al., "Method for Query Execution Planning". U.S. Appl. No. 15/073,890, filed Mar. 18, 2016, 30 pages.

Brodt et al., "Method for Extreme Value Computation". U.S. Appl. No. 15/008,960, filed Jan. 28, 2016, 33 pages.

* cited by examiner

|  | 231A | 231B |  |
|---|---|---|---|
|  | ID | AGE | 227 |
| b1 | 180 | 40 |  |
|  | 28 | 35 |  |
|  | 380 | 56 |  |
|  | 420 | 15 |  |
| b2 | 390 | 20 |  |
|  | 660 | 10 |  |
|  | 773 | 32 |  |
|  | 440 | 63 |  |
| b3 | 260 | 46 |  |
|  | 310 | 44 |  |
|  | 298 | 55 |  | bN

FIG.2

BULK DATA INSERTION IN ANALYTICAL DATABASES

BACKGROUND

Present invention embodiments relate to the field of digital computer systems, and more specifically, to inserting data to a data table.

Analytical database systems manage very large amounts of data and are optimized for queries that must read large portions of it. At the same time, they offer the complete querying power of Structured Query Language (SQL). As such systems do not focus on Online Transaction Processing (OLTP) load (i.e. involving point queries) they typically do not index each data row, but heavily rely on scan performance. Nevertheless, to speed up scan performance, analytical database systems often store information on blocks of data. Over the years, there is a continuous approach to develop improved sort technologies, in order to handle the data expansion that has occurred, both in volume and use of data.

SUMMARY

Various embodiments provide a method for inserting data to a data table, computer system and computer program product as described by the subject matter of the independent claims. Advantageous embodiments are described in the dependent claims. Embodiments of the present invention can be freely combined with each other if they are not mutually exclusive.

In one aspect, the invention relates to a computer implemented method for inserting data to a data table, where the data table has multiple data records and involves at least one organizing attribute (e.g. the organizing attribute comprises an attribute of the data table). The method comprises:
  defining a set of data blocks having records of the data table and assigning to each data block of the set of data blocks a predefined maximum number of records of the data table or a predefined maximum amount of storage;
  storing data records for each data block of the set of data blocks on a storage system;
  providing attribute value information for each data block of the set of data blocks, the attribute value information containing at least a minimum value representing the smallest value of the organizing attribute and a maximum value representing the largest value of the organizing attribute;
  receiving further data records to be inserted to the data table,
  buffering the received data records until data records for at least two further data blocks are available (the further data blocks may be defined as the set of data blocks e.g. each further data block can have a maximum number of records as defined for the set of data blocks);
  splitting the buffered data records into at least one ordered sequence of groups of records each having one value or a range of values of the organizing attribute such that each group of the sequence of groups does not exceed a data block of the further data blocks;
  writing on the storage system the groups in their order (in the sequence) on the storage system, resulting in adding further data blocks to the set of data blocks;
  determining attribute value information for the further data blocks for supporting query processing against the data table.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a computer system for inserting data to a data table, where the data table has multiple data records and involves at least one organizing attribute. The computer system is configured for:
  defining a set of data blocks having records of the data table by assigning to each data block of the set of data blocks a predefined maximum number of records of the data table or a predefined maximum amount of storage;
  storing data records for each data block of the set of data blocks on a storage system;
  providing attribute value information for each data block of the set of data blocks, the attribute value information containing at least a minimum value representing the smallest value of the organizing attribute and a maximum value representing the largest value of the organizing attribute;
  receiving further data records to be inserted to the data table,
  buffering the received data records until data records for at least two further data blocks are available;
  splitting the buffered data records into at least one ordered sequence of groups each having one value or a range of values of the organizing attribute such that a group does not exceed a data block;
  writing on the storage system the groups in their order on the storage system, resulting in adding further data blocks to the set of data blocks;
  determining attribute value information for the further data blocks for supporting query processing against the data table.

BRIEF DESCRIPTION OF THE DRAWINGS

In the following, embodiments of the invention are explained in greater detail, by way of example only, making reference to the drawings in which:

FIG. 2 is a graphical representation of a sample data table.

DETAILED DESCRIPTION

Figure 1:
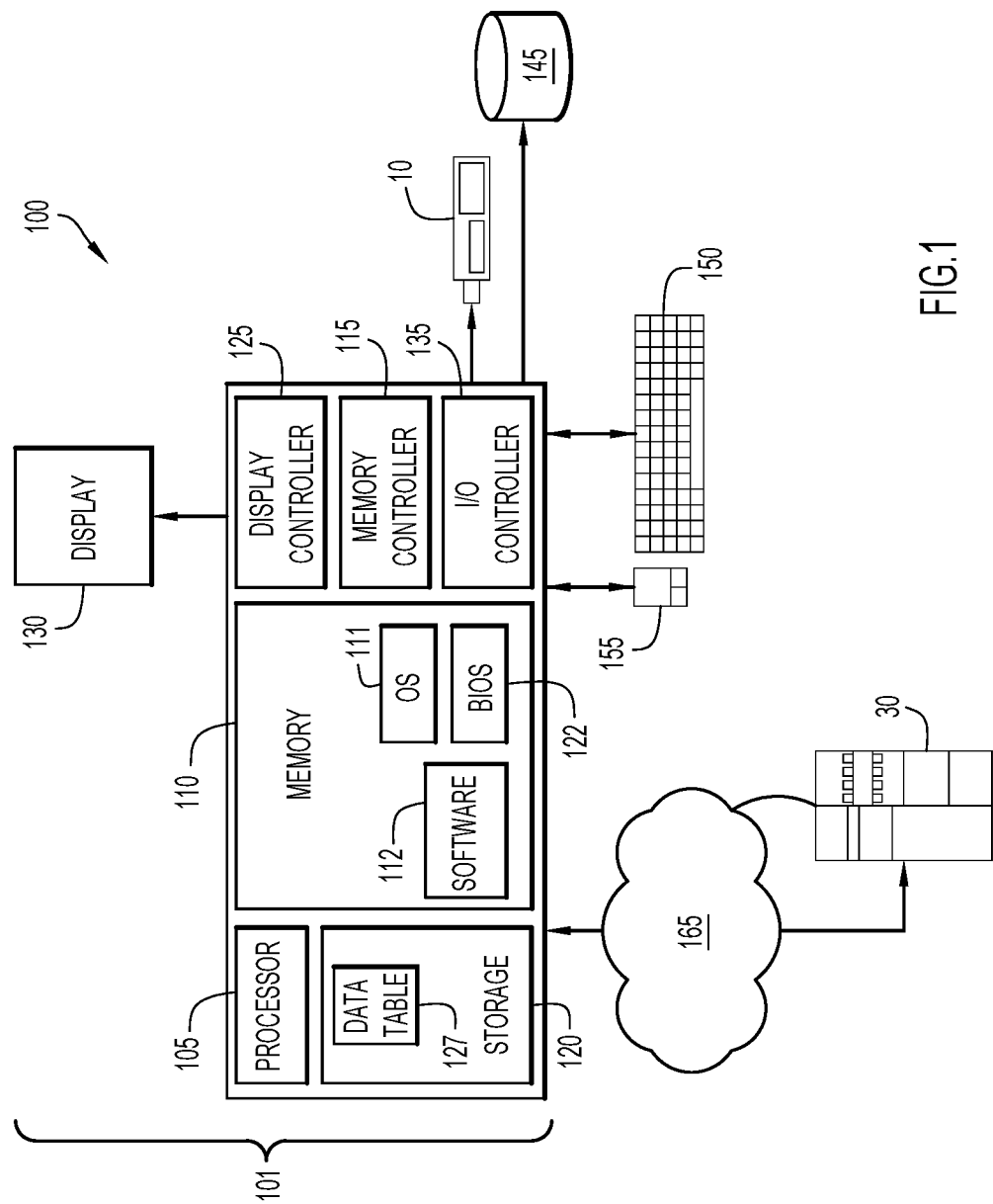
FIG. 1 is a block diagram of a computerized system, suited for implementing an embodiment of the present invention.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The attribute value information may be descriptive of the organizing attribute. Using the attribute value information, a preselection of data blocks of the data table may be performed before scanning the preselected data blocks. The attribute value information may comprise information or metadata on the organizing attribute that allows such a preselection. For example, the maximum and the minimum attribute values of the organizing attribute define a first range of values of the attribute in a respective data block. For example, a received data query may require a second range of values of the attribute. The processing of the data query may comprise selecting data blocks of the data table whose respective first range overlap with the second range and processing those selected data blocks, thereby forming a scan list.

Sorting into a sequence of groups of the buffered records gives the best smaller range of the attribute value information compared to the case where records are stored in the order with which they arrive. With the present method, rows that are to be inserted into a table T from an external source are first buffered, sorted by the organizing columns (also referred to as organizing attributes) of T, and then inserted into T.

In order to decide whether the present method should be employed for a given insert of unknown size, all rows may be loaded into the buffer. In case the entire set of rows to be inserted is lower than a certain threshold (at least two data blocks), then the rows may be appended to the table without sorting them.

For example, the method may further perform a data compression and distributing the data into pages after the sort is performed.

The effectiveness of the attribute value information may refer to a value between 0 and 1 representing the degree of overlap between data blocks, and may be regarded as an estimate of the expected fraction of data blocks which must be read for a point query, assuming that the point query key distribution is similar to the data distribution. Put differently, if it was not uniform then it would not matter if certain value ranges had high overlap as long as the queries did not query these ranges and instead focused on blocks or value ranges which happened to have low overlap.

Organizing columns or attributes tremendously improve the effectiveness of the attribute value information. However, the information only comes to play when the data is reorganized. Rows that are inserted into a table after the reorganization are again appended in order of arrival (i.e., somewhat randomly). Thus, the effectiveness begins to decrease as more data is inserted (or updated), until the table is reorganized again. To achieve good query performance through effective attribute value information at all times, reorganization must be performed quite frequently—at least every time rows have been inserted into a table. However, frequent reorganizations after data has been inserted, of course, come at very high costs with respect to the central processing unit (CPU) and input/output (I/O) as well as required temporary working memory and disk storage.

The present method may provide attribute value information on tables with organizing columns which do not degrade when new data is inserted. This may be done using fewer reorganization steps and thus increasing overall system performance. The present method may sort large insert batches by the organizing columns prior to writing the respective rows into the table.

The present method may not penalize data insertion as it is intended for large inserts by providing a threshold on the number of rows to be sorted before being inserted, spanning at least two data blocks.

The present method may have the following advantages:

The attribute value information may be more effective, which may greatly improve query performance due to fewer data being read and processed.

Fewer reorganizations may be required. Reorganization to improve attribute value information performance of organizing columns may only be rarely necessary using the present method. This is because the attribute value information is already quite effective. For example, with sufficiently large inserts (and thus sort runs) the resulting attribute value information may already be quite good.

Reorganizations may be cheaper. As every large insert can be considered a sort run, a full sort on the table may not be required.

The compression may be more effective. Particularly column-store databases make heavy use of data compression techniques, such as run-length encoding, delta/offset encoding, or dictionary encoding. These techniques work best if many similar or identical values occur in the same data block. Thus, on sorted data, these approaches achieve close to optimal compression effects. Due to this, the present method may require considerably less storage space than the state-of-the-art, at least on the organizing columns. While this may be beneficial for query performance, it may also save I/O operations for the insert, thus accelerating the present method.

According to one embodiment, the method further comprises sorting data records for each data block of the set of data blocks based on values of the organizing attribute and storing data records for each data block of the set of data blocks on consecutive storage units of the storage system following the order of the data records. This embodiment may be advantageous as it is not constrained to a full sorting of all records (e.g. the system may not need to wait for all records of the data table before performing the sorting). This may particularly be advantageous for very narrow range searches.

According to one embodiment, the method further comprises sorting data records for all data blocks of the set of data blocks based on values of the organizing attribute splitting the sorted records into the set of data blocks and storing all data records on consecutive storage units of the storage system following the order of the data records. Having all records of the data table sorted may provide attribute value information that is more selective and has higher probability that a data block can be skipped in a query.

According to one embodiment, the splitting of the buffered records comprises sorting all buffered records and splitting them into groups of records, each group of records being assigned to a respective data block of the further data blocks.

According to one embodiment, the splitting of the buffered records comprises: splitting the buffered records into two ordered sequences of groups, each sequence being assigned to a partition, wherein the partition comprises more than one data block of the further data blocks and sorting records of each partition.

The sorting methods of the further data blocks may have the advantages as described above with the set of data blocks.

According to one embodiment, the splitting of the buffered records comprises assigning to the further data blocks a respective pair of maximum and minimum values of the organizing attribute, thereby resulting in a consecutive non-overlapping range of values of the organizing attribute, and assigning each record of the received record to the corresponding data block using the value of the organizing attribute. The sequence of groups comprises or forms the further data blocks. This may prevent sorting all records to the completion as long as every record is stored in the same data block in which it would reside in the fully sorted case. This way a divide-and-conquer sort algorithm, such as quicksort, can stop earlier and is thus more efficient.

According to one embodiment, each data block of the data table has sorted records and is stored contiguously (i.e. on contiguous storage units) on the storage system. The method further comprises:
a) receiving a query against the data table, the query requiring a range of values of the organizing attribute;
b) using the attribute value information for selecting data blocks of the data table that may comprise values in the range of values;
c) for each data block of a subset of the selected data blocks identifying the first record of the data block that contains the lowest range value and consecutively reading record by record from the identified record until reaching the record having the highest value that is smaller or equal the highest range value of the range;
d) in case the number of read records is smaller than a predefined threshold repeating element c) for a further subset of the selected data blocks until the number of read records is higher than the threshold or until all records have been read;
e) returning the read records.

This embodiment may control access to data by limiting the search by scanning only a necessary number of data blocks. This may save resources compared to the case of a full processing of the data blocks. This embodiment may enable parallel processing of the subsets of data blocks (e.g. element c) may be performed from multiple subsets in parallel and the total number of read records may be compared with threshold.

According to one embodiment, each of the subsets of the selected data blocks comprises a predefined maximum number of data blocks. This embodiment may further control access to data by further limiting the search by scanning only a predefined number of data blocks. A controlled processing of data may be advantageous for the control of the whole system.

According to one embodiment, each data block of the data table comprises a set of records. The attribute value information further comprises a flag indicating that records of the block are sorted and stored on contiguous units of the storage system. This may enable the use of binary searches and other algorithms to explore sorted data based on the attribute value information while avoiding the need for sorting data.

According to one embodiment, the attribute value information further comprises an indicator of the first and last record of the set of records as stored in the storage system. These embodiments may facilitate physical access to data.

According to one embodiment, the indicator comprises an index pointing to the physical position of the first record and last record. This may prevent creating a full index for the whole data table and thus may save resources.

According to one embodiment, the received records are buffered in the main memory. Keeping the data residing in main memory during insert processing may be advantageous as sorting the data in this very moment is a lot cheaper than sorting it later (e.g. when data is on disk). This may save resources that would otherwise be required by first inserting the data and subsequently issuing a reorganization right away which causes a lot more work, as the data needs to be loaded and written twice.

In another example, the received records may be buffered on a disk space or external I/O device.

According to one embodiment, each data block of the data table has a predefined maximum number of records. Performing a selection on the number of records to define data blocks may be cheaper in terms of processing resources compared to the definition of data blocks based on storage size as each record may have to be sized. This may particularly be advantageous in case the storage space is not enough.

According to one embodiment, each data block of the data table is assigned a predefined maximum storage size. This may be advantageous as it may provide a controlled storage of data in a storage system which may avoid system congestion that may be caused by non-constrained storage of records.

According to one embodiment, the sorting is performed using a recursive divide and conquer process.

According to one embodiment, the method further comprises, before sorting the buffered records, performing at least one of: data type coercion, format conversions, and character padding on at least the organizing attribute of the records. In this case, the implementation is cheaper with respect to performance and implementation efforts if these steps have already been completed before sorting.

FIG. 1 is a block diagram of a general computerized system 100, suited for implementing an embodiment of the present invention.

It will be appreciated that the methods described herein are at least partly non-interactive, and automated by way of computerized systems, such as servers or embedded systems. In exemplary embodiments, though, the methods described herein can be implemented in a partly interactive system. These methods can further be implemented in software 112, which includes firmware 122, hardware (e.g. a processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In example embodiments, in terms of hardware architecture, as shown in FIG. 1, the computer 101 includes a processor 105, memory (e.g. main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (e.g. caches), drivers, repeaters, and receivers, to enable communications. Further, the local interface may include address, control, and/or data connections to enable appropriate communications among the aforementioned components. As described herein, the I/O devices 10, 145 may generally include any generalized cryptographic card or smart card known in the art.

The processor 105 is a hardware device for executing software, particularly that stored in memory 110. The processor 105 can be any custom made or commercially available processor, a CPU, an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM), such as DRAM, SRAM, SDRAM, etc.) and non-volatile memory elements (e.g., read only memory (ROM), erasable programmable read only memory (EPROM), electronically erasable programmable read only memory (EEPROM), or programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions or software 112 (e.g. instructions to manage databases such as a database management system).

The software in memory 110 shall also typically include a suitable operating system (OS) 111. The OS 111 essentially controls the execution of other computer programs, such as possibly software 112 for implementing methods as described herein.

The methods described herein may be in the form of a source program or software 112, executable program or software 112 (e.g. an object code), script, or any other entity comprising a set of instructions 112 to be performed. When the methods described herein are in the form of a source program, the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In example embodiments, a conventional keyboard 150 and mouse 155 can be coupled to the input/output controller 135. Other output devices such as the I/O devices 10, 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In example embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In example embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN), a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initializes and tests hardware at startup, starts the OS 111, and supports the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

The storage 120 may comprise at least one data table (or data set) 127. For example, the software 112 may receive, automatically or upon request, as input the data table 127, or may download the data table 127 from storage 120 or memory 110.

While FIG. 1 only shows a few attributes, it will be appreciated that numerous attributes may exist or may be used.

A query that enters the system 100 is analyzed and the query predicates are extracted. For relational databases the query predicates are assigned to the base table they act on. In this case, the following steps may be performed for every base table separately.

FIG. 2 is a graphical representation of a sample data table 227. The data table 227 may comprise one or more columns 231A-B, wherein each column is represented by a respective attribute (e.g. "ID" 231A and "Age" 231B). The rows of the data table 227 may each comprise values of the attributes 231A-B. The data table 227 may, for example, comprise or may be stored on multiple (e.g. contiguous) data blocks b1-bN.

The term "data block" as used herein may refer to a logical or physical storage for storing the data of the data table.

For example, as illustrated in FIG. 2, the data table 227 may be divided or split or assigned to data blocks b1-bN using the number of rows in the data table 227.

In another example, the data table 227 may be split or divided based on storage size such that each data block b1-bN contains or is assigned to one or more storage units (e.g. data pages). The term "storage unit" as used herein is intended to refer to the minimum addressable unit (e.g. by software 112) in order to store the data table 227. The size of a storage unit may be an integer multiple of the size of a disk unit. The size of the storage unit may be user defined. For example, each storage unit (e.g. data page) may correspond to a specific number of bytes of physical database space on disk (e.g., 4 KB). Other storage units having different granularities may be addressable or used in order to store data (e.g. store data in the storage 120). For example, other storage levels may comprise containers and extents, wherein extents can be defined in term of number of data pages, while a container can determined in term of number of extents.

The rows of each data block (e.g. b1) of the data table 227 may be stored on contiguous, linked, or indexed disk units (e.g. of storage 120) that form the corresponding data pages of the data block b1. The term disk unit refers to the minimum addressable unit on storage 120. For example, a disk unit may have a size of 512 bytes. The data blocks b1-bN may or may not comprise the same number of data pages.

In one example, the rows or records of each data block b1-bN may be sorted (e.g. each data block may be sorted separately, before being stored). The sorted rows of each data block b1-bN may be stored on contiguous storage units.

In another example, the rows of the data table 227 may all be sorted and may thus be split to be assigned to the data blocks b1-bN.

In a further example, the rows of the data table 227 or of data blocks b1-bN may not be sorted.

The term "data table" or data set as used herein refers to a collection of data that may be presented in tabular form. Each column in the data table may represent a particular variable or attribute. Each row in the data table may represent a given member, record or entry of the data table.

Each data block b1-bN may be associated with attribute value information. For example, the attribute value information may be saved together with the data block to which it is associated, which indicates that the attribute value information and the data block correspond to each other). In another example, the attribute value information may be stored (e.g. in a table) separately from the associated data block and having pointers/addresses or links to the associated data block.

While FIG. 2 only shows a few data blocks, it will be appreciated that numerous data blocks may exist or may be used.

Figure 3:
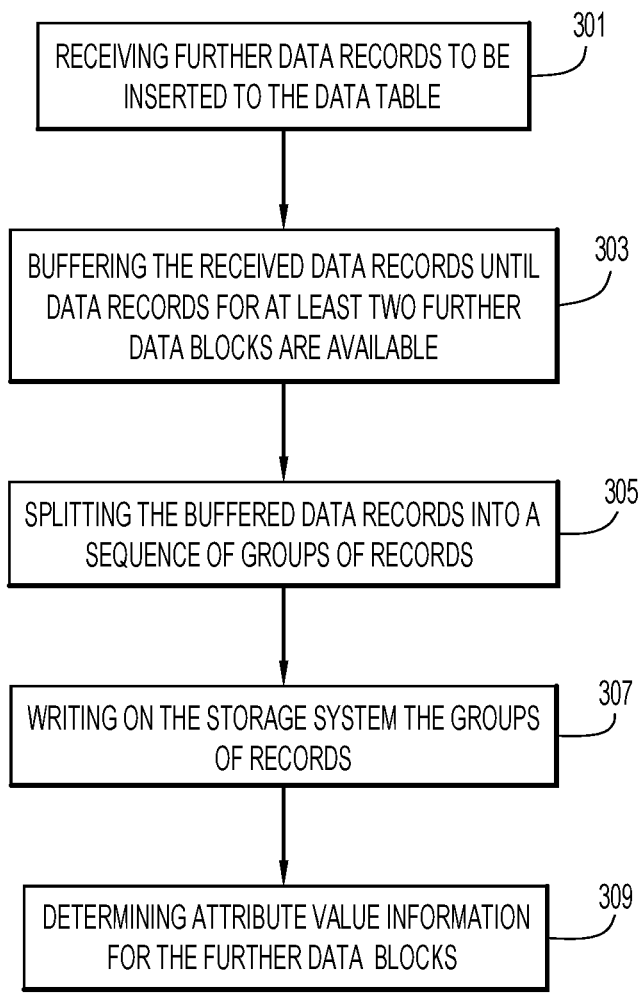
FIG. 3 is a flowchart of a method of inserting data to a data table.

FIG. 3 is a flowchart of a method for inserting data to a data table (e.g. data table 227).

In action 301, data records to be inserted to the data table may be received. For example, the data records may be received simultaneously or over a time period. Each of received data records has values of the attributes (231A-B) of the data table 227 into which the records are to be inserted. The received records may be further records to be added to the records that the data table already comprises.

The received records may be buffered in action 303 in a given buffering area of the computer system 100 until data records for at least two further data blocks are available.

In action 305, the buffered data records may be split into at least one ordered sequence of groups each having one value or a range of values of the organizing attribute such that a group does not exceed a data block. For example, in case the splitting may be performed such that each group comprises one record, this may be equivalent to sorting all buffered data records record by record. In one example the splitting may be a logical splitting or may involve moving of data in the memory.

In another example, the splitting may be performed using a recursive divide and conquer process which may result in groups of more than one records each having a range that is not overlapping with the ranges of the other groups. However, records inside each group may not be sorted. The splitting may be performed with the divide and conquer process until each group fits in a respective data block (e.g. each of the resulting groups of the splitting cannot exceed a data block). For example, if a data block is defined by a maximum number of rows, then each group may not have records in number higher than that maximum number.

The splitting may comprise in case of using the divide and conquer process: recursively using "divide and conquer sorting algorithm" (e.g. quicksort, radix sort, combinations thereof, etc.) to organize the buffered records into groups fitting into the further data blocks, wherein the "divide and conquer sorting algorithm" recursively partitions value range (e.g. [a, b]) of the attribute into multiple range partitions (e.g. [a, c] and [c, b]) and assigns entries of the buffered records to resulting value range partitions (e.g. each entry or row has a value of the attribute that can be used to determine to which of the ranges [a, c] and [c, b] it belongs), stopping the "divide and conquer sorting algorithms" for each value range partition when records of the buffered records assigned to the respective value range partition fit into a data block; and storing the value range partitions generated by the "divide and conquer sorting algorithms" in the data blocks.

The divide and conquer process may comprise Quicksort process, radix sorting process, insertion sort process or a combination thereof.

In action 307, the groups of data records may be written or stored on the storage system (e.g. 120) in order. This may result in further data blocks to the set of data blocks. This may for example be done by storing the records on contiguous storage units of the storage system in accordance with the order in which the records or groups are sorted. For example, a first ordered record (or first group of records) may be first stored followed physically by a second ordered record (or second group of records) and so on.

In action 309, attribute value information may be determined for the further data blocks. The attribute value information may comprise at least a minimum value representing the smallest value of the organizing attribute and a maximum value representing the largest value of the organizing attribute in each of the further data blocks.

Figure 4:
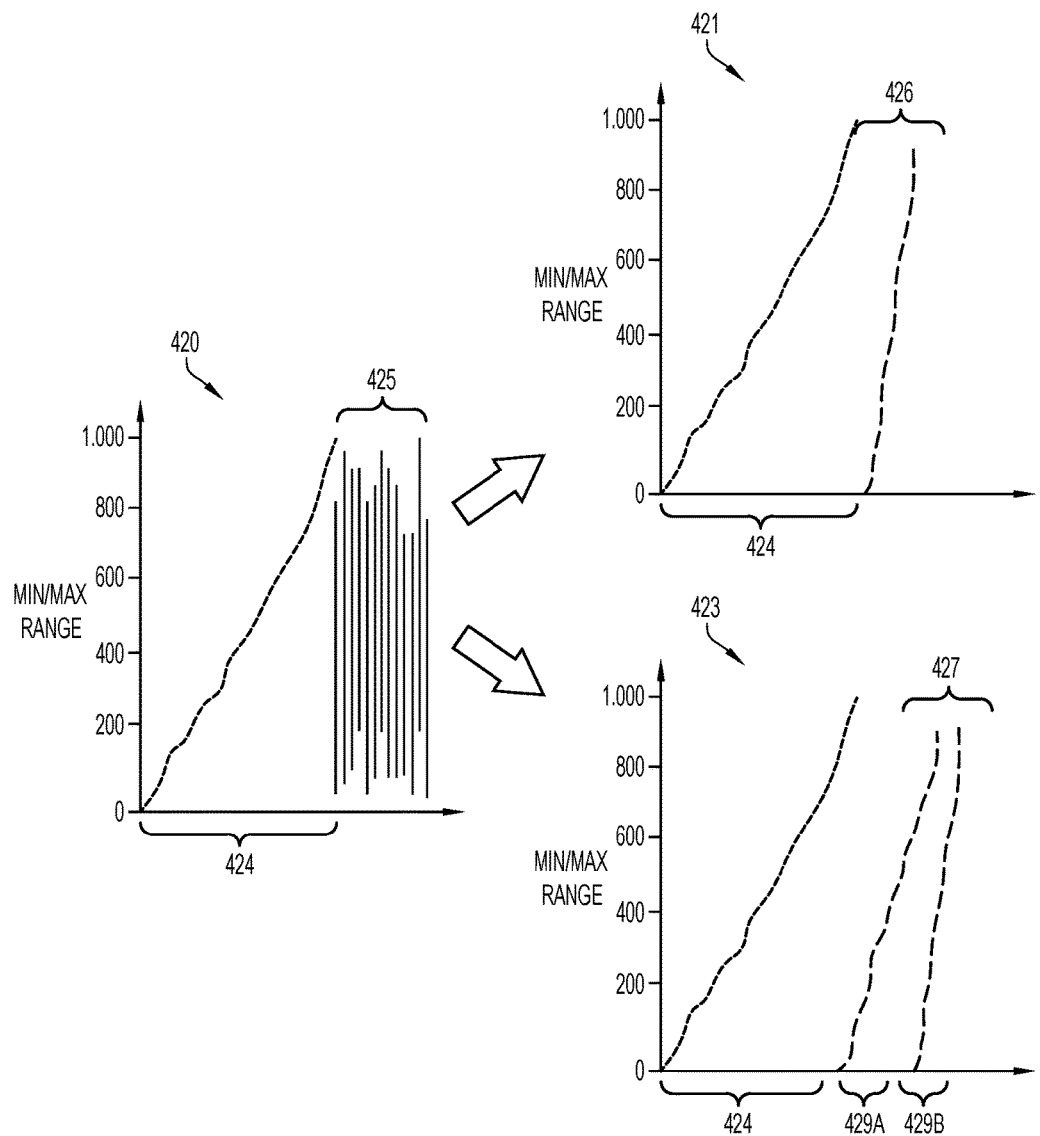
FIG. 4 illustrates graphs showing the minimum and maximum values in data blocks that form a data table.

FIG. 4 illustrates graphs showing the minimum and maximum values in data blocks that form a data table. In particular, further data blocks 425 are illustrated in graph 420. Graph 420 further shows the minimum and maximum values in each data block of the set of data blocks 424 that forms the data table 227 before inserting the further data blocks 425 (each vertical line in graphs 420-423 represents the range of values of the organizing attribute in a single data block).

If, for example, data blocks of the data tables are defined using the number of records or rows, such that each data block has a predefined maximum number of records, then the buffering may be performed until the received records are twice that predefined maximum number of records.

If, in another example, data blocks of the data tables are defined based on the storage size such that each data block has a predefined maximum storage size, then the buffering may be performed until the received records have reached twice that predefined maximum size.

The buffering area where the buffering is performed may comprise the main memory 110 or other storages such as storage 120 or external storage such as 145.

The splitting described in accordance with action 305 may be performed such that the buffered records may first all be sorted and then assigned to respective further data blocks. This may result in a new distribution of the further data blocks 426 as shown in graph 421 which is different from the distribution of the further data blocks in graph 420. This is because the further data blocks are not sorted in the graph 420 and are just appended to the data table as they are received.

The buffering area may comprise main memory 110. In case the amount of received records is larger than can be accommodated by the main memory, external sorting may be used which may involve disk I/O operations.

Alternatively, several "sort runs" can be created instead of fully sorting the received records. This effectively distributes the records into partitions that are sorted internally, but not across partitions. Given a sufficiently large main memory, this is still capable of creating good attribute value information, as illustrated in graph 423. Graph 423 shows two partitions 429A and 429B for the further data blocks 427, wherein records are sorted per partition 429A-B. The number of data blocks (referred to as 425, 426 and 427) shown in the graphs 420-423 before and after applying the splitting may or may not be the same number and are shown for illustration purpose. For example, the number of data blocks (referred to as 425, 426 and 427) may be different because the sorted values can be better compressible and thus be stored in smaller number of data blocks.

Sort runs may be saved, such that future reorganizations but also queries involving sort operations (which includes sort-merge joins or grouping through sort) can be accelerated as the system does not forget about existing sort runs in the data table 227. Sets of adjacent data blocks may contain rows with monotonously growing column values. This can be achieved using another auxiliary data structure. Every time the system sorts a subset of the table—when inserting a sorted batch of rows—the start and end data block of the subset is recorded. If a single insert creates several sort runs, as proposed herein, each is recorded.

Whenever a full sort by organizing columns of the table 227 is required, the existing sort runs can be merged. Note that there can still be data blocks that are not sorted at all. These occurred when smaller inserts took place that did not qualify for our proposed approach. The rows from these data blocks first have to be sorted into one or more separate sort runs before being merged with the rest of the table. In one example, it may not be necessary to sort the received records to completion, as long as every record is stored in the same data block in which it would reside in the fully sorted case. In this example, a divide-and-conquer sort algorithm, such as quicksort, can stop earlier and is thus more efficient. Note that when doing so, no strict sort runs are created that can directly be exploited as described above. Nevertheless, it is still worth keeping track of the "near-sorted" runs, as these only require a sort within each zone so that they can be merged with others.

Small inserts (e.g. the buffered received records are not enough to be or form two data blocks) may be treated in the following manner: The small inserts are added to a special insert partition of the table 127. This insert partition is accessible to queries (i.e. the respective rows are committed and visible). This insert partition may or may not reside on different storage and the rows may or may not be in the same storage format as the actual table. However, when a query reads the table (e.g. 127), the system under the hood performs a UNION ALL operation of the actual table and the insert partition.

At the same time the insert partition acts as the buffering area used for sorting, as explained above. As soon as the sort partition contains a sufficiently large amount of records (e.g. until records or row for at least two data blocks are available) the rows are sorted and moved out of the insert partition and into the actual table 127. This may be performed by a system transaction in the background.

The insert partition may be organized by a row based technique, which may be significantly more efficient for small inserts compared to the column based storage technique. As soon as enough rows have accumulated, the per-row cost of creating a column-organized layout (e.g. in case the data table 127 has a column-base structure) becomes tolerable and the rows are moved into the actual column store. Assuming a system that employs such an approach, it may be beneficial to sort the rows by the organizing column before converting them to the columnar format.

In another example a method for inserting data to a data table in a database management system is provided, where the data table has multiple data records and involves at least an organizing attribute. The method comprises: storing data records of the data table in a set of data blocks; providing attribute value information for the data blocks, the attribute value information containing at least a min value representing the smallest value of the first attribute and a max value representing the largest value of the organizing attribute; receiving further data records to be inserted to the data table; buffering the received data records (in memory) until data records for at least two data blocks are available; ordering the buffered data records based on values of the organizing attribute; writing the ordered data records to data blocks, resulting in further data blocks to the set of data blocks; and determining attribute value information for the further data blocks.

In another example, a computer implemented method for inserting data to a data table is provided. The data table has multiple data records and involves at least one organizing attribute. The method comprises: defining a set of data blocks having records of the data table and assigning to each data block of the set of data blocks a predefined maximum number of records of the data table or a predefined maximum amount of storage; storing data records for each data block of the set of data blocks on a storage system; providing attribute value information for each data block of the set of data blocks, the attribute value information containing at least a minimum value representing the smallest value of the organizing attribute and a maximum value representing the largest value of the organizing attribute; receiving further data records to be inserted to the data table, buffering the received data records until data records for at least two further data blocks are available; sorting the buffered data records based on values of the organizing attribute in the buffered data records; writing on the storage system the sorted data records in their order on the storage system, resulting in adding further data blocks to the set of data blocks; and determining attribute value information for the further data blocks for supporting query processing against the data table.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for inserting data to a data table, wherein the data table includes multiple data records and has at least one organizing attribute, the method comprising:
    defining a set of data blocks having records of the data table and assigning to each data block of the set of data blocks a predefined maximum number of records of the data table or a predefined maximum amount of storage;

storing data records for each data block of the set of data blocks on a storage system;

providing attribute value information for each data block of the set of data blocks, the attribute value information containing at least a first range of values of an organizing attribute defined by a minimum value representing a smallest value of the organizing attribute and a maximum value representing a largest value of the organizing attribute;

receiving further data records to be inserted to the data table and buffering the received data records;

in response to the received data records requiring less than two further data blocks for storage, appending the received data records to the data table without sorting;

in response to the received data records requiring at least two further data blocks for storage:

sorting and splitting the buffered data records into at least one ordered sequence of groups, each group having one value or a range of values of the organizing attribute such that a group does not exceed a data block;

adding further data blocks to the set of data blocks by writing, on the storage system, the groups in the ordered sequence; and determining attribute value information for the further data blocks; and processing a query against the data table, wherein the query indicates a second range of values of the organizing attribute, and wherein processing the query comprises selecting data blocks with the first range of values overlapping the second range of values of the query.

2. The method of claim 1, further comprising:

sorting data records for each data block of the set of data blocks based on values of the organizing attribute; and storing data records for each data block of the set of data blocks on consecutive storage units of the storage system following an order of the data records.

3. The method of claim 1, further comprising:

sorting data records for all data blocks of the set of data blocks based on values of the organizing attribute;

splitting the sorted records into the set of data blocks; and storing all data records on consecutive storage units of the storage system following an order of the data records.

4. The method of claim 1, wherein the splitting of the buffered data records comprises:

sorting all buffered data records; and splitting the buffered data records into the groups of records, each group of records being assigned to a respective data block of the further data blocks.

5. The method of claim 1, wherein the splitting of the buffered data records comprises:

splitting the buffered data records into two ordered sequences of groups, each sequence being assigned to a partition, wherein the partition comprises more than one data block of the further data blocks and sorting records of each partition.

6. The method of claim 1, wherein the splitting of the buffered data records comprises:

assigning to the further data blocks a respective pair of maximum and minimum values of the organizing attribute such that the organizing attribute has a consecutive non-overlapping range of values; and assigning each data record of the received data records to a corresponding data block of the further data blocks using the value of the organizing attribute, the sequence of groups comprising the further data blocks.

7. The method of claim 1, wherein each data block of the data table has sorted records and is stored contiguously on the storage system, the method further comprising:

for each data block of a subset of the selected data blocks, identifying a first record of the data block that contains a lowest range value within the second range of the query and consecutively reading record by record from the identified record until reaching a record having a highest value that is smaller or equal to a highest range value of the second range of the query;

when a number of read records is smaller than a predefined threshold, identifying and consecutively reading a further subset of the selected data blocks until the number of read records is higher than the threshold or until all records have been read; and returning the read records.

8. The method of claim 7, wherein the subset of the selected data blocks comprises a predefined maximum number of data blocks.

9. The method of claim 1, wherein each data block of the set of data blocks comprises a set of records, and wherein the attribute value information further comprises a flag indicating that records of the data block are sorted and stored on contiguous units of the storage system.

10. The method of claim 9, wherein the attribute value information further comprises an indicator of a first and a last record of the set of records as stored in the storage system.

11. The method of claim 10, wherein the indicator comprises an index pointing to a physical position of the first record and the last record.

12. The method of claim 1, wherein the received data records are buffered in a main memory.

13. The method of claim 1, wherein each data block of the data table has a predefined maximum number of records.

14. The method of claim 1, wherein each data block of the data table is assigned a predefined maximum storage size.

15. The method of claim 1, wherein the splitting is performed using a recursive divide and conquer process.

16. The method of claim 1, further comprising, before splitting the buffered data records, performing at least one of: data type coercion, format conversions, and character padding on the organizing attribute of the buffered data records.

17. A computer program product comprising a computer-readable storage medium having computer-readable program code embodied therewith, the computer-readable program code configured to:

define a set of data blocks having records of a data table and assign to each data block of the set of data blocks a predefined maximum number of records of the data table or a predefined maximum amount of storage;

store data records for each data block of the set of data blocks on a storage system;

provide attribute value information for each data block of the set of data blocks, the attribute value information containing at least a first range of values of an organizing attribute defined by a minimum value representing a smallest value of the organizing attribute and a maximum value representing a largest value of the organizing attribute;

receive further data records to be inserted to the data table and buffer the received data records;

in response to the received data records requiring less than two further data blocks for storage, append the received data records to the data table without sorting;

in response to the received data records requiring at least two further data blocks for storage:
  sort and split the buffered data records into at least one ordered sequence of groups, each group having one value or a range of values of the organizing attribute such that a group does not exceed a data block;
  add further data blocks to the set of data blocks by writing, on the storage system, the groups in the ordered sequence; and
  determine attribute value information for the further data blocks; and
process a query against the data table, wherein the query indicates a second range of values of the organizing attribute, and wherein processing the query comprises selecting data blocks with the first range of values overlapping the second range of values of the query.

18. A computer system for inserting data to a data table, where the data table has multiple data records and involves at least one organizing attribute, the computer system including at least one processor configured to:
  define a set of data blocks having records of the data table and assign to each data block of the set of data blocks a predefined maximum number of records of the data table or a predefined maximum amount of storage;
  store data records for each data block of the set of data blocks on a storage system;
  provide attribute value information for each data block of the set of data blocks, the attribute value information containing at least a first range of values of an organizing attribute defined by a minimum value representing a smallest value of the organizing attribute and a maximum value representing a largest value of the organizing attribute;
  receive further data records to be inserted to the data table and buffer the received data records;
  in response to the received data records requiring less than two further data blocks for storage, append the received data records to the data table without sorting;
  in response to the received data records requiring at least two further data blocks for storage;
    sort and split the buffered data records into at least one ordered sequence of groups, each group having one value or a range of values of the organizing attribute such that a group does not exceed a data block;
    add further data blocks to the set of data blocks by writing, on the storage system, the groups in the ordered sequence; and
    determine attribute value information for the further data blocks; and
  process a query against the data table, wherein the query indicates a second range of values of the organizing attribute, and wherein processing the query comprises selecting data blocks with the first range of values overlapping the second range of values of the query.

* * * * *